United States Patent [19]

Donomoto et al.

[11] Patent Number: 4,548,126
[45] Date of Patent: Oct. 22, 1985

[54] PISTON WITH LOCAL INORGANIC FIBER REINFORCEMENT AND METHOD OF MAKING THE SAME

[75] Inventors: Tadashi Donomoto; Mototsugu Koyama; Yoshio Fuwa; Nobuhiro Miura, all of Toyota; Tatsuo Sakakibara, Ueda, all of Japan

[73] Assignees: Toyota Jidosha Kabushiki Kaisha, Toyota; Art Metal Manufacturing Co. Ltd., Tokyo, both of Japan

[21] Appl. No.: 410,026

[22] Filed: Aug. 20, 1982

[30] Foreign Application Priority Data

Nov. 30, 1981 [JP] Japan .............................. 56-191918

[51] Int. Cl.⁴ .............................................. F16J 1/01
[52] U.S. Cl. ...................................... 92/213; 92/212; 92/222; 92/248
[58] Field of Search ................. 92/212, 213, 222, 224, 92/248, 254; 29/156.5 R

[56] References Cited

U.S. PATENT DOCUMENTS

| 2,795,467 | 6/1957 | Colwell | 92/222 |
| 3,075,817 | 1/1963 | Mayes | 92/213 |
| 4,334,507 | 6/1982 | Kohnert et al. | 92/224 |

FOREIGN PATENT DOCUMENTS

| 35628 | 9/1981 | European Pat. Off. | 92/222 |
| 53-41622 | 4/1978 | Japan | 92/222 |
| 57-173661 | 10/1982 | Japan | 92/248 |

Primary Examiner—Charles T. Jordan
Assistant Examiner—Richard Klein
Attorney, Agent, or Firm—Oblon, Fisher, Spivak, McClelland & Maier

[57] ABSTRACT

An engine piston is formed with a top crown surface and a top ring groove. An upper annular land surface is defined between the top ring groove and the edge of the top crown surface. The upper annular land surface and the side walls of the top ring groove are defined by a part of the piston which is formed of a matrix metal reinforced with inorganic fibers. The proportion of the inorganic fibers by volume in the reinforced part of the piston may optionally be approximately between 2% and 10%. A method for making such a piston includes forming a mass of inorganic fiber into an approximately cylindrical shape, placing it against the edge of the bottom surface of a hollow cylindrical lower mold, pouring molten metal into the lower mold to cover the inorganic fiber, sliding an upper mold into the lower mold and pressurizing the molten metal to infiltrate it between the inorganic fibers until complete solidification, removing the solidified mass of metal and entrapped inorganic fiber from the lower mold, and machining it to form a piston, with the fiber reinforced parts defining the upper ring groove side walls and the upper land surface.

12 Claims, 10 Drawing Figures

PISTON WITH LOCAL INORGANIC FIBER REINFORCEMENT AND METHOD OF MAKING THE SAME

BACKGROUND OF THE INVENTION

The present invention relates to an engine piston, and more particularly relates to an engine piston of which a part at least is composite reinforced by inorganic fibers, preferably alumina/silica fibers.

In an internal combustion engine the piston or pistons thereof are generally subject to very severe operational conditions, and as a result the provision of a strong constitution therefor is very important. In particular, the two important design characteristics that are very important for an engine piston are resistance to wear and resistance to burning or seizure. Now, the part of a piston that is most subject to wear is the upper and lower wall surfaces of the top ring receiving groove thereof, because these surfaces slide under high pressure and temperature conditions and inevitably often under rather poor lubrication conditions against the top piston ring; while the part of a piston that is most subject to burning and seizure is the top land portion thereof, i.e. the part of the side wall surface of the piston between the top or crown thereof and said first ring groove, because this part of the piston is not only almost directly exposed to the flame within the cylinder and the exhaust gases while being rather poorly cooled by conduction to the cylinder side wall, but also slides along or close to said cylinder side wall at high speed, again inevitably often under rather poor lubrication conditions. These conditions of severe wear and severe burning and/or seizure are aggravated in the case of a diesel internal combustion engine, because of the higher compression ratio thereof, which entails generally a more severe cylinder environment.

Accordingly, in the prior art it has been widely practiced, in the case of diesel engines, for the part of the piston from which the top piston ring groove is formed to include a reinforcing insert formed of special cast iron such as Niresist cast iron, and since the wearing characteristics of such a form of cast iron are better than the wearing characteristics of the sort of metal from which such a piston is mainly constructed, such as a light alloy such as for example aluminum alloy, thereby the piston is made to be more resistant to wearing on its portion (the side wall surfaces of the top ring groove) which is most subject to such wear, while still being mainly made of a material such as the light alloy.

However, such pistons with cast in anti wear rings made of special cast iron such as Niresist cast iron have certain defects, as follows. First, special cast iron such as Niresist cast iron has a much higher specific gravity than does a light alloy such as for example aluminum alloy, and therefore a piston including a cast in anti wear ring of special cast iron such as Niresist cast iron is necessarily rather heavier than a piston made of light alloy such as aluminum alloy only. Although this does not present any particular problems in the case of a diesel engine for low or medium speed use, on the other hand in the case of a diesel engine for high speed use, or in the case of a gasoline engine, it presents problems with regard to the attainment of higher performance. Second, the thermal conductivity of special cast iron such as Niresist cast iron is much lower than that of a light alloy such as for example aluminum alloy (in fact, is between one fifth and one tenth thereof), and therefore a piston including a cast in anti wear ring of special cast iron such as Niresist cast iron has much poorer heat dissipation characteristics, since a significant part of the cooling of a piston is accomplished by conduction of heat from the crown of the piston via the piston rings to the side wall of the combustion cylinder, and accordingly said cooling takes place rather poorly via such an anti wear ring of special cast iron such as Niresist cast iron, if one in fact is provided. This means that in the case of a high performance engine, in which the thermal load on the piston is high, a danger exists of a buildup of heat in the crown portion of the piston, which can lead to melting thereof, or to seizing of the piston in the cylinder, or to burning damage and the like. Third, special cast iron such as Niresist cast iron is expensive. Fourth, special cast iron such as Niresist cast iron is difficult to work. Finally, fifth, since special cast iron such as Niresist cast iron has a poor affinity for light alloy such as for example aluminum alloy, this necessitates special processing for such a cast in anti wear ring formed of such special cast iron, such as so called Alfin processing. As a result of all this, a piston including such a cast in anti wear ring made of special cast iron is expensive and is not fully satisfactory in use.

SUMMARY OF THE INVENTION

Accordingly, it is the primary object of the present invention to provide an engine piston, which has good anti wear characteristics and good anti seizing characteristics, without being unduly heavy or expensive.

It is a further object of the present invention to provide such an engine piston, while particularly has good anti wear characteristics in at least the side walls of the top ring groove thereof.

It is a further object of the present invention to provide such an engine piston, which particularly also provides good anti wear characteristics for the top piston ring which is used therewith.

It is a further object of the present invention to provide such an engine piston, which particularly has good anti seizing characteristics in at least the top land portion thereof.

It is a further object of the present invention to provide such an engine piston, which has good anti wear characteristics even in operational conditions of poor lubrication thereof.

It is a further object of the present invention to provide such an engine piston, which has good anti seizing characteristics even in operational conditions of poor lubrication thereof.

It is a further object of the present invention to provide such an engine piston, which is able to withstand the severe engine environment of a high compression engine.

It is a further object of the present invention to provide such an engine piston, which is able to withstand the severe engine environment of a diesel engine.

It is a further object of the present invention to provide such an engine piston, which is able to withstand the severe engine environment of a high performance engine.

It is a further object of the present invention to provide such an engine piston, which is as light as possible.

It is a further object of the present invention to provide such an engine piston, which has good thermal conductivity.

It is a further object of the present invention to provide such an engine piston, which has good heat fatigue strength.

It is a further object of the present invention to provide such an engine piston, which can well conduct heat from the piston crown to the side walls of the engine cylinder.

It is a further object of the present invention to provide such an engine piston, which runs cool and minimizes heating up during use.

It is a further object of the present invention to provide such an engine piston, which is easy to fabricate.

It is a further object of the present invention to provide such an engine piston, which does not incorporate any separate inlaid reinforcing portion which has a poor affinity for the material of the main part of the piston.

It is a further object of the present invention to provide such an engine piston, which does not incorporate any separate inlaid reinforcing portion which needs to be specially processed in order to adhere well to the material of the main part of the piston.

It is a further object of the present invention to provide such an engine piston, which has uniform characteristics over its entirety.

It is a further object of the present invention to provide a method of manufacturing an engine piston, which has good anti wear characteristics and good anti seizing characteristics, without being unduly heavy or expensive.

It is a further object of the present invention to provide a method of manufacturing such an engine piston, which particularly has good anti wear characteristics on at least the side walls of the top ring groove thereof.

It is a further object of the present invention to provide a method of manufacturing such an engine piston, which particularly also provides good anti wear characteristics for the top piston ring which is used therewith.

It is a further object of the present invention to provide a method of manufacturing such an engine piston, which particularly has good anti seizing characteristics in at least the top land portion thereof.

It is a further object of the present invention to provide a method of manufacturing such an engine piston, which has good anti wear characteristics even in operational conditions of poor lubrication thereof.

It is a further object of the present invention to provide a method of manufacturing such an engine piston, which has good anti seizing characteristics even in operational conditions of poor lubrication thereof.

It is a further object of the present invention to provide a method of manufacturing such an engine piston, which is able to withstand the severe engine environment of a high compression engine.

It is a further object of the present invention to provide a method of manufacturing such an engine piston, which is able to withstand the severe engine environment of a diesel engine.

It is a further object of the present invention to provide a method of manufacturing such an engine piston, which is able to withstand the severe engine environment of a high performance engine.

It is a further object of the present invention to provide a method of manufacturing such an engine piston, which is as light as possible.

It is a further object of the present invention to provide a method of manufacturing such an engine piston, which has good thermal conductivity.

It is a further object of the present invention to provide a method of manufacturing such an engine piston, which has good heat fatigue strength.

It is a further object of the present invention to provide a method of manufacturing such an engine piston, which can well conduct heat from the piston crown to the side walls of the engine cylinder.

It is a further object of the present invention to provide a method of manufacturing such an engine piston, which runs cool and minimizes heating up during use.

It is a further object of the present invention to provide a method of manufacturing such an engine piston, which is easy to practice.

It is a further object of the present invention to provide a method of manufacturing such an engine piston, which does not incorporate any separate inlaid reinforcing portion which has a poor affinity for the material of the main part of the piston.

It is a further object of the present invention to provide a method of manufacturing such an engine piston, which does not incorporate any separate inlaid reinforcing portion which needs to be specially processed in order to adhere well to the material of the main part of the piston.

It is a further object of the present invention to provide a method of manufacturing such an engine piston, which has uniform characteristics over its entirety.

It is a further object of the present invention to provide a method of manufacturing such an engine piston, which is easy to fabricate.

It is a further object of the present invention to provide a method of manufacturing an engine piston, which has good anti wear characteristics and good anti seizing characteristics, without being unduly heavy or expensive.

According to the present invention, these and other objects that relate to a piston are accomplished by an engine piston formed with a top crown surface, a top ring groove, and an upper annular land surface defined between said top ring groove and the edge of said top crown surface, characterized in that said upper annular land surface and the side walls of said top ring groove are defined by a part of said piston formed of a matrix metal reinforced with inorganic fibers.

According to such a structure, since at least the side walls of said top ring groove and also said upper annular land surface are reinforced by said inorganic fibers, thus being better with regard to anti wear characteristic than the part of the piston which is not so reinforced, thereby the anti wear characteristic of the piston as a whole is much superior to that of a piston made without reinforcement, such as a piston made only out of the matrix metal, and is similar to that of a piston of the above mentioned prior art kind which is reinforced with special cast iron.

According to a particular aspect of the present invention, these and other objects are more particularly and concretely accomplished by an engine piston of the sort described above, further characterized in that said matrix metal is an aluminum alloy, and said inorganic fibers are alumina-silica fibers having a composition of about 51% by weight $Al_2O_3$ and about 49% by weight $SiO_2$, the proportion of said inorganic fibers by volume in said reinforced part of said piston being approximately between 2% and 10%.

According to such a structure, since further the thermal conductivity of such inorganic fibers is higher than that of special cast iron such as Niresist cast iron, the anti seizing characteristic of the piston, as a whole, is much superior to that of a piston of the above mentioned prior art kind which is reinforced with said special cast iron, and is substantially similar to that of a piston made without reinforcement, such as a piston made only out of the matrix metal, i.e. of aluminum alloy or the like. Further, since the density of the inorganic fiber reinforced part as a whole is approximately the same as the density of the piston as a whole, thereby the engine piston as described above according to the present invention is substantially lighter than a piston of the above mentioned prior art kind which is reinforced with said special cast iron. Thus it is possible to consider using such a piston in an engine of higher performance than has heretofore been possible.

Further, according to a particular aspect of the present invention, these and other objects are more particularly and concretely accomplished by an engine piston of either of the sorts described above, further characterized in that substantially all the parts of said piston which are not formed of matrix metal reinforced with inorganic fibers are formed of a metal which is substantially the same as said matrix metal.

According to such a structure, the part of the piston formed of matrix metal reinforced with inorganic fibers has good affinity for the remainder of the piston, and adheres well thereto without the need for any particular special treatment. Further, the above mentioned similarity with regard to density of the fiber reinforced portion of the piston and of the non reinforced portion of the piston is assured.

Further, according to a particular aspect of the present invention, these and other objects are more particularly and concretely accomplished by an engine piston of either of the first two sorts described above, further characterized in that at least 90% of said inorganic fibers have fiber diameters between 1 micron and 20 microns.

According to such a structure, it is assured that neither is the fiber diameter so small that the effectiveness of improvement of anti wear characteristics and anti seizing characteristics is jeopardized, nor is the fiber diameter so large that the wear on the top piston ring, which fits in said top ring groove, is unduly great, or that the thermal conductivity and the heat fatigue strength of the piston material are deteriorated.

Further, according to a particular aspect of the present invention, these and other objects are more particularly and concretely accomplished by an engine piston of either of the first two sorts described above, further characterized in that at least 90% of said inorganic fibers have fiber lengths less than 20 mm.

According to such a structure, the fiber length of the inorganic fibers is kept short enough so that no danger arises of irregularities in fiber density occurring, which might cause irregularities in physical properties of the resultant fiber reinforced material, such as irregularities in the anti wear characteristic and the anti seizing characteristic thereof, which would deteriorate the durability of the finished piston.

Further, according to a particular aspect of the present invention, these and other objects are more particularly and concretely accomplished by an engine piston of either of the first two sorts described above, further characterized in that the surface parallel orientation ratio of the inorganic fibers making up said side walls of said top ring groove is 50% or less.

According to such a structure, since as will be seen by the results of experiments that will shortly be described the fact that the surface parallel orientation ratio of the inorganic fibers forming the side walls of the top ring groove is low ensures that said side walls have good anti wear characteristics, thus the durability of the piston during use is maximized. In this specification, as will be explained in more detail later, the expression "surface parallel orientation ratio" is used to mean, considering the elliptical cross section of each of the inorganic fibers sectioned by a surface, the ratio of the local density of inorganic fibers intersecting this surface the ratio of the long axis to the short axis of said elliptical section of which is three or more, to the local density of the total of organic fibers intersecting said surface with no account being taken of the proportions of said elliptical section. Thus the surface parallel orientation ratio with respect to a particular surface is a measure of approximately what local proportion of the reinforcing inorganic fibers lie roughly parallel to said surface.

Further, according to a particular aspect of the present invention, these and other objects are more particularly and concretely accomplished by an engine piston of either of the first two sorts described above, further characterized in that said part of said piston formed of matrix metal reinforced with inorganic fibers is circularly symmetrical and forms an annulus around the top portion of said piston, its cross section being approximately rectangular except for said top ring groove which it includes; or, alternatively, in that said part of said piston formed of matrix metal reinforced with inorganic fibers is formed as a cylindrical shell defined between an outer and an inner cylindrical surface, said inner cylindrical surface of said part of said piston formed of matrix metal reinforced with inorganic fibers being of smaller radius than the radius of the annular bottom surface of said top ring groove, and the outer cylindrical surface of said part of said piston formed of matrix metal reinforced with inorganic fibers being of radius equal to the radius of said outer cylindrical surface of said piston and defining the upper part of said outer cylindrical surface of said piston; said part of said piston formed of matrix metal reinforced with inorganic fibers extending, in the axial direction of said piston, from said upper crown surface thereof to an axial position along the axis of said piston which is further removed from said upper crown surface than is the lower annular side wall surface of said top ring groove; said top ring groove, including its said annular bottom surface, being completely defined within said part of said piston formed of matrix metal reinforced with inorganic fibers; or, alternatively, in that the upper annular side wall surface of said top ring groove, the lower annular side wall surface of said top ring groove, and the annular bottom surface of said top ring groove, are all defined completely within said part of said piston formed of matrix metal reinforced with inorganic fibers; and further in that said upper land surface of said piston is also defined within said part of said piston formed of matrix metal reinforced with inorganic fibers; said piston also having a middle land surface which is only partly defined within said part of said piston formed of matrix metal reinforced with inorganic fibers, said middle land surface having an annular boundary defined around approximately its axially middle portion, said boundary delimiting said part of said piston formed of matrix metal reinforced with inorganic fibers from said remainder portion of said piston which is not so reinforced.

According to such a structure, these surfaces, i.e. the upper annular side wall surface of the top ring groove, the lower annular side wall surface of the top ring groove, the annular bottom surface of the top ring groove, and the upper land surface of the piston, which are all defined within said part of said piston formed of matrix metal reinforced with inorganic fibers, are in fact the surfaces of the piston which suffer the most severe conditions during use of the piston; this is a fact well known per se in the piston art. Thus, because these surfaces are made of the above specified inorganic fiber reinforced composite material rather than not being reinforced, it is to be expected that the piston will exhibit much improved durability with respect to frictional wear on these surfaces, and with respect to anti seizing characteristic, as compared to a conventional piston.

Further, according to an alternative particular aspect of the present invention, these and other objects are more particularly and concretely accomplished by an engine piston of either of the first two sorts described above, further characterized in that said part of said piston formed of matrix metal reinforced with inorganic fibers is circularly symmetrical, and is divided, forming an upper annulus portion closer to said piston crown around the top portion of said piston, and a lower annulus portion farther from said piston crown than said upper annulus portion around said top portion of said piston; the cross section of said upper annulus portion being approximately rectangular, and the cross section of said lower annulus portion being also approximately rectangular; the cross section of said top ring groove dividing said cross section of said upper annulus portion of said part of said piston formed of matrix metal reinforced with inorganic fibers from said cross section of said lower annulus portion of said part of said piston formed of matrix metal reinforced with inorganic fibers; or, alternatively, in that said part of said piston formed of matrix metal reinforced with inorganic fibers is formed as two axially opposed cylindrical shell portions, each defined between an outer and an inner cylindrical surface, said inner cylindrical surfaces of said axially opposed shell portions being of substantially equal radii and of substantially the same radius as the radius of the annular bottom surface of said top ring groove, and said outer cylindrical surfaces of said two axially opposed shell portions being of substantially equal radii and of substantially the same radius as the radius of said outer cylindrical surface of said piston and defining the upper part of said outer cylindrical surface of said piston; the upper one of said axially opposed cylindrical shell portions of said part of said piston formed of matrix metal reinforced with inorganic fibers extending, in the axial direction of said piston, from said upper crown surface thereof to the upper annular side wall surface of said top ring groove; and the lower one of said axially opposed cylindrical shell portions of said part of said piston formed of matrix metal reinforced with inorganic fibers extending, in the axial direction of said piston, from the lower annular side wall surfaces of said top ring groove to an axial position further removed from said piston crown than is said lower annular side wall surface of said top ring groove; said top ring groove being defined between said two axially opposed cylindrical shell portions of said part of said piston formed of matrix metal reinforced with inorganic fibers; and, further in this latter case, optionally in that the upper annular side wall surface of said top ring groove is defined within said upper one of said two axially opposed cylindrical shell portions of said part of said piston formed of matrix metal reinforced with inorganic fibers; the lower annular side wall surface of said top ring groove is defined with said lower one of said two axially opposed cylindrical shell portions of said part of said piston formed of matrix metal reinforced with inorganic fibers; said upper land surface of said piston is also defined within said upper one of said two axially opposed cylindrical shell portions of said part of said piston formed of matrix metal reinforced with inorganic fibers; said piston also has a middle land surface which is only partly defined within said lower one of said two axially opposed cylindrical shell portions of said part of said piston formed of matrix metal reinforced with inorganic fibers, said middle land surface having an annular boundary defined around approximately its axially middle portion, said boundary delimiting said lower one of said two axially opposed cylindrical shell portions of said part of said piston formed of matrix metal reinforced with inorganic fibers from the remainder portion of said piston which is not so reinforced; and the annular bottom surface of said top ring groove being not defined within either of said two axially opposed cylindrical shell portions of said part of said piston formed of matrix metal reinforced with inorganic fibers, but being defined within said remainder portion of said piston which is not so reinforced.

According to such a structure, these surfaces, i.e. said upper annular side wall surface of said top ring groove, said lower annular side wall surface of said top ring groove, and said upper land surface of said piston, which are all defined within said upper and lower axially opposed cylindrical shell portions of said part of said piston formed of matrix metal reinforced with inorganic fibers, are in fact the surfaces of said piston which suffer said most severe conditions during use of the piston; this is a fact well known per se in the piston art. Thus, because these surfaces are made of said above specified part of said piston formed of matrix metal reinforced with inorganic fibers, rather than not being reinforced, it is to be expected that said piston will again exhibit much improved durability with respect to frictional wear on these surfaces, and with respect to anti seizing characteristic, as compared with a conventional piston. The fact that the bottom of said top ring groove of said piston is not defined within either of said upper and lower axially opposed cylindrical shell portions of said part of said piston formed of matrix metal reinforced with inorganic fibers, may perhaps mean that this bottom surface is itself more prone to wear than is the bottom surface of the top ring groove in the alternative construction described proximately above, but in fact said bottom of said top ring groove is not subjected to nearly so much wear as are said upper and lower side wall surfaces of said top ring groove, so that this may not be a very important disadvantage. Further, this constructional fact also makes for good heat conduction from the piston ring fitted in said top ring groove to the main body of said piston, which can be important for increasing durability of said piston; and, by reducing the amount of inorganic fiber required for construction of said piston, it also makes for cheapness of construction of said piston, as well as increased manufacturability thereof.

Further, according to another alternative particular aspect of the present invention, these and other objects are more particularly and concretely accomplished by an engine piston of either of the first two sorts described above, further characterized in that said part of said piston formed of matrix metal reinforced with inorganic fibers is circularly symmetrical, and is divided, forming an upper annulus portion closer to said piston crown around the top portion of said piston, and a lower annulus portion farther from said piston crown than said upper annulus portion around said top portion of said piston; the cross section of said upper annulus portion being formed as two abutted rectangles; and the cross section of said lower annulus portion being approximately rectangular; the cross section of said top ring groove dividing said cross section of said upper annulus portion of said part of said piston formed of matrix metal reinforced with inorganic fibers from said cross section of said lower annulus portion of said part of said piston formed of matrix metal reinforced with inorganic fibers; or, alternatively, in that said part of said piston formed of matrix metal reinforced with inorganic fibers is formed as two axially opposed annular portions; said lower annular portion of said part of said piston formed of matrix metal reinforced with inorganic fibers being defined between an outer and an inner cylindrical surface, said inner cylindrical surface of said lower annular portion of said part of said piston formed of matrix metal reinforced with inorganic fibers being of substantially the same radius as the radius of the annular bottom surface of said top ring groove, and the outer cylindrical surface of said lower annular portion of said part of said piston formed of matrix metal reinforced with inorganic fibers being of radius substantially equal to the radius of the outer cylindrical surface of said piston and defining part of the upper part of the outer cylindrical surface of said piston; and said upper annular portion of said part of said piston formed of matrix metal reinforced with inorganic fibers being defined between an outer cylindrical surface and an inner stepped cylindrical surface, the smaller radius of said stepped inner cylinder surface of said upper annular portion of said part of said piston formed of matrix metal reinforced with inorganic fibers being substantially the same as said radius of said annular bottom surface of said top ring groove and as said inner cylindrical surface of said lower annular portion of said part of said piston formed of matrix metal reinforced with inorganic fibers, and the larger radius of said stepped inner cylindrical surface of said upper annular portion of said part of said piston formed of matrix metal reinforced with inorganic fibers being somewhat larger than said smaller radius thereof; the part of said upper annular portion of said part of said piston formed of matrix metal reinforced with inorganic fibers on the side of the step in said stepped inner cylinder surface of said upper annular portion of said part of said piston formed of matrix metal reinforced with inorganic fibers remote from said top ring groove being somewhat thinner than is its part on the side of said step towards said top ring groove; and the outer cylindrical surface of said upper annular portion of said part of said piston formed of matrix metal reinforced with inorganic fibers being of radius approximately equal to said radius of said outer cylindrical surface of said piston and defining part of said upper part of said outer cylindrical surface of said piston; said upper annular portion of said part of said piston formed of matrix metal reinforced with inorganic fibers extending, in the axial direction of said piston, from the upper crown surface thereof to said upper annular side wall surface of said top ring groove; and said lower annular portion of said part of said piston formed of matrix metal reinforced with inorganic fibers extending, in said axial direction of said piston, from said lower annular side wall surface of said top ring groove to an axial position further removed from said piston crown than is said lower annular side wall surface of said top ring groove; said top ring groove being defined between said two annular portions of said part of said piston formed of matrix metal reinforced with inorganic fibers; and, further in this latter case, optionally in that said upper annular side wall surface of said top ring groove is defined within said upper annular portion of said part of said piston formed of matrix metal reinforced with inorganic fibers, and said lower annular side wall surface of said top ring groove is defined within said lower annular portion of said part of said piston formed of matrix metal reinforced with inorganic fibers; and further said upper land surface of said piston is also defined within said upper annular portion of said part of said piston formed of matrix metal reinforced with inorganic fibers; said piston also having a middle land surface which is only partly defined within said lower annular portion of said part of said piston formed of matrix metal reinforced with inorganic fibers, said middle land surface having an annular boundary defined around approximately its axially middle portion, said boundary delimiting said lower annular portion of said part of said piston formed of matrix metal reinforced with inorganic fibers from the remainder portion of said piston which is not so reinforced; and said annular bottom surface of said top ring groove being not defined within either said upper or said lower annular portions of said part of said piston formed of matrix metal reinforced with inorganic fibers, but being defined within said remainder portion of said piston which is not so reinforced.

According to such a structure, these surfaces, i.e. said upper annular side wall surface of said top ring groove, said lower annular side wall surface of said top ring groove, and said upper land surface of said piston, which are all defined within said upper and lower annular portions of said part of said piston formed of matrix metal reinforced with inorganic fibers, are again in fact the surfaces of said piston which suffer the most severe conditions during use of said piston; this is again a fact well known per se in the piston art. Thus, because these surfaces are made of said above specified inorganic fiber reinforced composite material rather than not being reinforced, it is to be expected that said piston will exhibit much improved durability with respect to frictional wear on these surfaces, and with respect to anti seizing characteristic, as compared with a conventional piston. The fact that the bottom of said top ring groove of said piston is not defined within either of said upper and lower annular portions of said part of said piston formed of matrix metal reinforced with inorganic fibers may mean that this lower surface is itself perhaps more prone to wear than is the lower surface of said top ring groove in the first of the two alternative constructions proximately detailed above, but in fact as mentioned before said bottom of said top ring groove is not subjected to nearly so much wear as are said top and bottom side surfaces of this ring groove, so that this may not be a very important disadvantge. This fact is the same as in the case of the second of the two alternative constructions proximately detailed above. However, the difference in this third possible construction, in that said upper annular portion of said part of said piston formed of matrix metal reinforced with inorganic fiber is stepped so that its upper portion is radially thinner than is its lower portion, is quite important, because this constructional fact makes for good heat conduction from the upper land portion of said piston to the main body of said piston, which can be important for increasing durability of said piston to a durability level even higher than the durability attained by making said bottom surface of said top ring groove not be composed of composite fiber reinforced material (as in the case of said second of the two alternative constructions proximately detailed above); and also, by yet further reducing the amount of inorganic fiber required for construction of said piston by even more than the amount saved in said second of the two alternative constructions proximately detailed above as compared with the first of said two alternative constructions, it also makes for further increase in cheapness of construction of said piston, as well as further increased manufacturability thereof.

Further, according to the present invention, these and other objects that relate to a method of piston manufacture are accomplished by a method for forming an engine piston, comprising the steps, performed in the specified order, of: (a) forming a mass of inorganic fiber into an approximately cylindrical shape; (b) placing said approximately cylindrically shaped mass of inorganic fiber against the approximately circular bottom surface of a substantially hollow cylindrical lower mold, so as to at least approximately lie against the edge of said approximately circular bottom surface and against the bottom part of the side wall of said substantially hollow cylindrical lower mold, said placed mass of inorganic fiber lying with a certain fiber density; (c) pouring a mass of molten metal into said substantially hollow cylindrical lower mold, to cover said placed mass of inorganic fiber; (d) sliding a substantially cylindrical upper mold, which cooperates closely with said substantially hollow cylindrical lower mold, into said substantially hollow cylindrical lower mold, and pressurizing the upper surface of said mass of molten metal in said substantially cylindrical lower mold with said substantially cylindrical upper mold in a manner of molten metal forging, said molten metal infiltrating under this pressurizing between the fibers of said placed mass of inorganic fiber, and maintaining said pressurization until said mass of molten metal has completely solidified, entrapping said placed mass of inorganic fiber; (e) removing said solidified mass of metal and entrapped inorganic fiber from said substantially cylindrical lower mold; and (f) machining said solidified mass of metal and entrapped inorganic fiber to form an engine piston with a top crown surface, a top ring groove, and an upper annular land surface defined between said top ring groove and the edge of said top crown surface, at least said upper annular land surface and the side walls of said top ring groove being defined by a machined part of said solidified mass of metal and entrapped inorganic fiber which includes said entrapped inorganic fiber and which is reinforced thereby.

According to such a method, a piston as described previously is formed, with its fiber reinforced part being formed by the mass of inorganic fiber, located against the edge of said approximately circular bottom surface and against the bottom part of the side wall of said substantially hollow cylindrical lower mold, being infiltrated by the mass of molten metal under pressure. Thus the finished piston is provided with an appropriately located fiber reinforced portion, which uses the same matrix metal as the metal which is used for making the remainder of the piston which is not fiber reinforced. Therefore the part of the piston formed of matrix metal reinforced with inorganic fibers has good affinity for the remainder of the piston, and adheres well thereto without the need for any particular special treatment. Further, the density of the fiber reinforced portion of the piston and of the non reinforced portion of the piston is approximately the same, which as explained above is desirable.

This above described method of forming the engine piston according to the present invention is the preferred one, according to the present invention, but as an alternative it would be possible to form the engine piston with a composite fiber reinforced portion according to the present invention by some two stage process. In such a method, first a fiber reinforced matrix metal piece or insert of the required shape is made by some process such as a casting process using the autoclave method, the sintering method, or the hot press method, and then this insert is placed in a predetermined position in a mold and molten matrix metal such as aluminum alloy is poured into the mold to form the remainder portion of the piston which is not composite reinforced. By doing this the piston is cast. Either of these methods is practicable, but the single stage method detailed above is the preferred one, in view of ease of practice and good manufacturability.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims.

In the drawings.

DESCRIPTION OF THE PREFERRED EMBODIMENTS

The piston and the method of piston manufacture according to the present invention will now be described with reference to several preferred embodiments thereof, and with reference to the appended drawings. However, first some experimental researches which have been made by the present inventors will be described, said experimental researches relating to the desirable characteristics for the portion of the piston which is reinforced with inorganic fibers as will be seen hereinafter.

GENERAL FORMAT OF THE WEAR EXPERIMENTS

At various places later in this specification the carrying out of wear tests on inorganic fiber reinforced materials is mentioned. These tests are generally carried out in a fashion similar to the wear test which will now be described as an example. A composite material was formed using aluminum alloy (JIS standard AC8A) as a matrix metal and using alumina/silica fibers (approximately 51% by weight $Al_2O_3$ and 49% by weight $SiO_2$) as reinforcing inorganic fibers. A block of this composite material of dimensions 16 mm by 6 mm by 10 mm was cut, with the 16 mm × 10 mm face to be used as the experimental surface. This block was then fitted to a friction wear experimental machine, and was set to rub frictionally against the outer moving surface of a rotating cylindrical test sample made of spherical graphite cast iron (JIS standard FCD70), of outer diameter 35 mm, inner diameter 30 mm, and width 10 mm. This cylindrical test sample was rotated at 160 rpm for one hour, while the rubbing contacting portions of said cylindrical test sample and of said block of fiber reinforced material were supplied with lubricating oil (Castle 5W-30 lubricating oil) at a constant temperature of 25° C., with a pressure of 60 kg being maintained between them. After this experiment, the amount of wear of the block of fiber reinforced material was measured.

SEIZING EXPERIMENTS

At various places later in this specification the carrying out of seizing tests on inorganic fiber reinforced materials is mentioned. These tests are generally carried out in a fashion similar to the seizing test which will now be described as an example. From a composite material formed in the same way as in the above wear experiments, a block of dimensions 30 mm by 30 mm by 5 mm was cut, with the 30 mm by 30 mm face to be used as the experimental surface. This block was then fitted to a friction wear testing machine, and was pressed against a rotating cylindrical test sample made of ordinary cast iron (JIS standard FC25), of outer diameter 26 mm, inner diameter 20 mm, and width 17 mm. This cylindrical test sample was rotated at 1000 rpm, while the rubbing contacting portions of said cylindrical test sample and of said block of fiber reinforced material were supplied with lubricating oil (Castle 5W-30 lubricating oil) at a constant temperature of 25° C. During this experiment, the pressure between the cylindrical test sample and the block of fiber reinforced material was gradually increased until seizing occurred between them, and this critical seizing pressure was measured.

VOLUME PROPORTION OF INORGANIC FIBERS EXPERIMENTS

Using alumina/silica fibers of average diameter 3 microns of the above described composition of approximately 51% by weight $Al_2O_3$ and 49% by weight $SiO_2$ as reinforcing inorganic fiber material, and using the above described aluminum alloy (JIS standard AC8A) as matrix metal, with the alumina/silica fibers randomly oriented in their embedment in the matrix metal, and using various different proportions of alumina/silica fibers relative to the matrix metal, various different pieces of compound material were made and tested as described above with relation to wear tests and seizing tests. The results of these experiments may be summarized as follows. If the proportion by volume of alumina/silica fibers was less than about 2% by volume, then it was determined that the improvement in anti wear characteristics and anti seizing characteristics, as compared to comparison samples formed only of matrix metal, i.e. formed of the above described aluminum alloy (JIS standard AC8A), was very small; but, on the other hand, if the proportion by volume of alumina/silica fibers was greater than about 10% by volume, then it was determined that, although the improvement in anti wear characteristics was good, as compared to comparison samples formed only of matrix metal, however the thermal conductivity fell and the anti seizing characteristic fell. Therefore, considering these facts, it is considered that the desirable percentage by volume of alumina/silica fibers is approximately between 2% and 10%.

FIBER DIAMETER OF INORGANIC FIBER EXPERIMENTS

Using alumina/silica fibers of the above described composition of approximately 51% by weight $Al_2O_3$ and 49% by weight $SiO_2$ of various diameters from 0.2 to 50 microns in diameter as reinforcing inorganic fiber material, and using the above described aluminum alloy (JIS standard AC8A) as matrix metal, with the alumina/silica fibers randomly oriented in their embedment in the matrix metal, and again using various different proportions of alumina/silica fibers relative to the matrix metal, various different pieces of composite material were made and tested as described above with relation to wear tests and seizing tests. The results of these experiments may be summarized as follows. If the diameter of the reinforcing inorganic fibers was less than about one micron, then it was determined that the improvement in anti wear characteristics and anti seizing characteristics, as compared to comparison samples formed only of matrix metal, i.e. formed of the above described aluminum alloy (JIS standard AC8A), was very small. Further, on the other hand, if the diameter of the reinforcing inorganic fibers was greater than about 20 microns, then it was determined that, although the improvement in anti wear characteristics was good, as compared to comparison samples formed only of matrix metal, however the amount of wear on the cooperating cast iron cylindrical test sample against which the fiber reinforced material rubbed was very great; and also it was difficult to manufacture the fiber reinforced material, since it was difficult to configure the mat of inorganic fibers, to be incorporated thereinto, into a desired particular shape. Therefore, considering these facts, it is considered that the desirable diameter of the reinforcing alumina/silica fibers is approximately between 1 and 20 microns.

Further, in order to investigate this matter further, various different pieces of composite material were made and tested as described above with relation to wear tests and seizing tests, while varying the ratio of the number of fibers with diameters approximately between 1 and 20 microns to the number of fibers with diameters outside this range. The results of these experiments may be summarized as follows: it is considered that the desirable proportion of the reinforcing alumina/silica fibers with diameters approximately between 1 and 20 microns is 90% or more.

FIBER LENGTH OF INORGANIC FIBER EXPERIMENTS

Using alumina/silica fibers of the above described composition of approximately 51% by weight $Al_2O_3$ and 49% by weight $SiO_2$ of various diameters from 1 to 20 microns (i.e. within the above described preferable diameter range) as reinforcing inorganic fiber material, and using the above described aluminum alloy (JIS standard AC8A) as matrix metal, with the alumina/silica fibers randomly oriented in their embedment in the matrix metal, and using a volume proportion of alumina/silica fibers relative to the matrix metal of 8%, and also varying the fiber lengths in the range 0.5 to 50 mm, various different pieces of composite material were made by vacuum forming and tested as described above with relation to wear tests and seizing tests. The results of these experiments may be summarized as follows. If the lengths of the reinforcing inorganic fibers were more than about 20 mm, then it was determined that variations in the density and concentration of the mat of inorganic fibers occurred during manufacture of the fiber reinforced material, and as a result variations in the density of the final fiber reinforced material occurred, which resulted in variations in the anti wear characteristics and anti seizing characteristics thereof. This is quite unacceptable. Therefore, considering these facts, it is considered that the desirable length of the reinforcing alumina/silica fibers is approximately 20 mm.

Further, in order to investigate this matter further, various different pieces of composite material were made and tested as described above with relation to wear tests and seizing tests, while varying the ratio of the number of fibers with lengths approximately less than 20 mm to the number of fibers with lengths greater than 20 mm. The results of these experiments may be summarized as follows: it is considered that the desirable proportion of the reinforcing alumina/silica fibers with length less than about 20 mm is 90% or more.

ORIENTATION OF INORGANIC FIBER EXPERIMENTS

Figure 1:
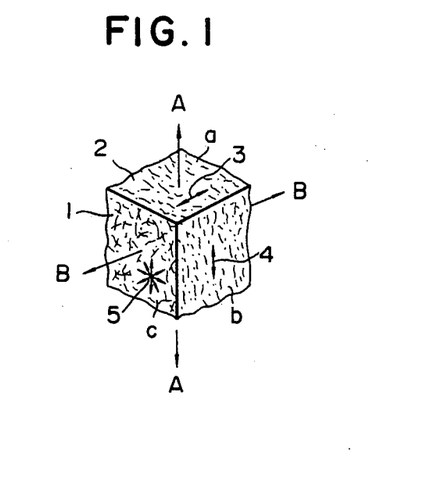
FIG. 1 is a perspective view of a part of a piece of composite material which is used as a sample for testing purposes, as described later, showing three different faces of said piece of composite material with different surface parallel orientation ratios.
Figure 2:
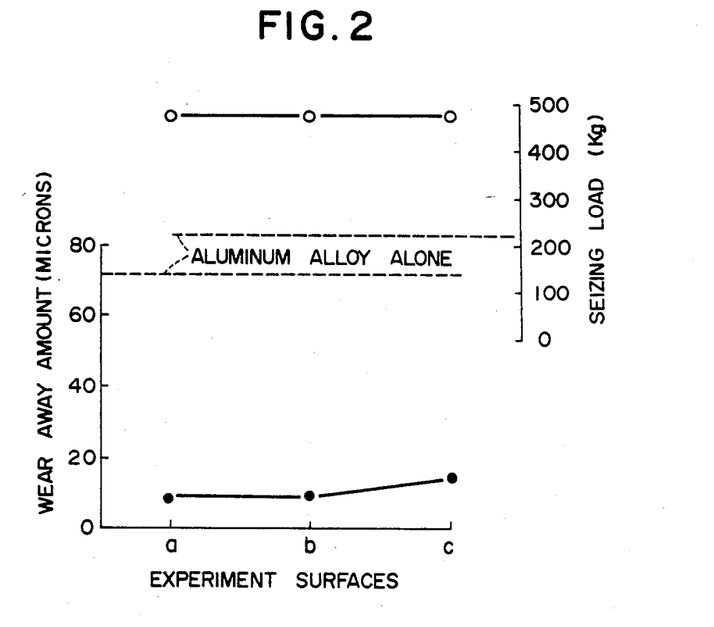
FIG. 2 is a diagram illustrating certain physical characteristics of a sample of composite material and of two comparison samples, in which wear away amount of said sample of composite material and of said two comparison samples, and also the seizing load therefor, are both shown on the vertical scale.

Using alumina/silica fibers of the above described composition of approximately 51% by weight $Al_2O_3$ and 49% by weight $SiO_2$, such that 95% of the fibers had diameters from 1 to 20 microns in diameter as reinforcing inorganic fiber material, the average fiber diameter being 2.8 microns, with approximately 93% of the fibers having lengths not exceeding 20 mm, using the above described aluminum alloy (JIS standard AC8A) as matrix metal, and using the proportion of 8% by volume of alumina/silica fibers relative to the matrix metal, a piece of composite material was made, said piece being illustrated in FIG. 1 of the appended drawings, which is a perspective view of a part of said piece of composite material. In fact, the fibrous mat into which the inorganic alumina/silica fibers were formed before being surrounded by matrix metal was so formed that the final piece of fiber reinforced composite material had the "surface parallel orientation ratio" for the surfaces shown by "a", "b", and "c" in FIG. 1 respectively, of 24%, 28%, and 73%. The piece of composite material illustrated in FIG. 1 was tested as described above with relation to wear tests and seizing tests, and the results are shown in FIG. 2, in which wear away amount of the sample of composite material, and also the seizing load therefor, are both shown on the vertical scale, as are the corresponding values for a piece of comparison material which is just the above described aluminum alloy (JIS standard AC8A) with no fiber reinforcement.

From this figure, it can be seen that the face c, which had a high surface parallel orientation ratio mean value, had a resistance to wear characteristic worse than did the faces a and b, which had relatively low surface parallel orientation ratio values—although of course in both of these cases the resistance to wear was far better than in the case of the piece of aluminum alloy with no reinforcing alumina/silica fibers. On the other hand, the face c, which had a high surface parallel orientation ratio value, had a resistance to seizing characteristic substantially the same as that of the faces a and b, which had relatively low surface parallel orientation ratio values—although similarly of course in both of these cases the resistance to seizing was far better than in the case of the piece of aluminum alloy with no reinforcing alumina/silica fibers. As a result of several further tests, it is considered that, for the best wear characteristics on a particular surface of the matrix material reinforced with inorganic fibers, the surface parallel orientation ratio on that surface should be about 50% or less.

HIGH TEMPERATURE TENSILE STRENGTH EXPERIMENTS

Figure 3:
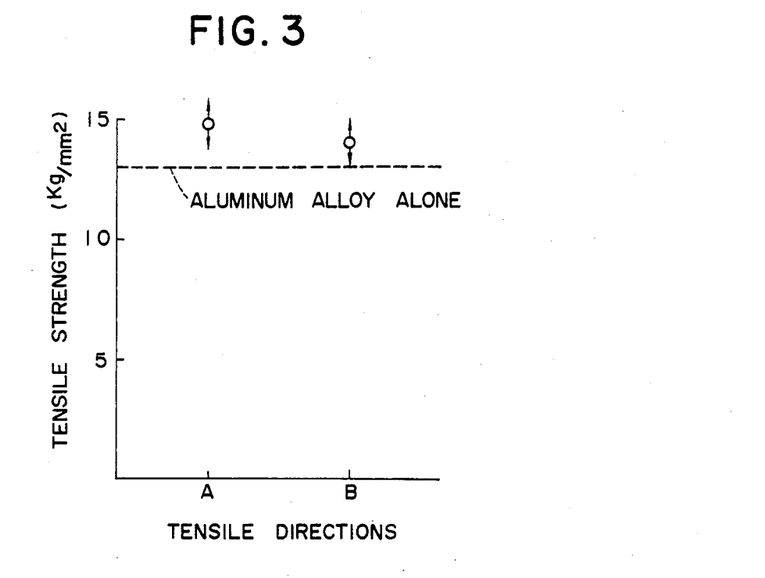
FIG. 3 is a diagram illustrating tensile strength of a sample of composite material and of a comparison sample, in which tensile strength is shown on the vertical scale.

By using pieces of the same composite material and of the same fiber orientations as those used in the above described tests investigating the relationship of anti wear characteristics and of anti seizing characteristics to surface parallel orientation ratio and illustrated in FIG. 1 of the appended drawings, tension tests were performed. The pieces of composite material were tested as follows. First they were heated for 100 hours at a temperature of 250° C., and then still at this temperature of 250° C. high temperature tensile strength tests were conducted in the directions shown in FIG. 1 as "A" and "B". The results are shown in FIG. 3, in which tensile strength is shown on the vertical scale, as is the corresponding tensile strength value for a piece of comparison material which is just the above described aluminum alloy (JIS standard AC8A) with no fiber reinforcement.

From this figure, it can be seen that the tensile strength at 250° C. in the direction B perpendicular to the face c which had a high surface parallel orientation ratio value had a high temperature tensile strength a little worse, i.e. lower, than the tensile strength at 250° C. in the direction A perpendicular to the face a which had a low surface parallel orientation ratio value—although of course in both of these cases the high temperature tensile strength was better than in the case of the piece of aluminum alloy with no reinforcing alumina/silica fibers. Thus, as a conclusion, the addition of reinforcing alumina/silica fibers does not in any case deteriorate the high temperature tensile strength of the composite material, as compared to a material which is just composed of matrix metal with no reinforcing inorganic fibers.

CONCLUSIONS

From the above and other experiments performed by the present inventors, it has been established to be the case that, provided that the proportion by volume of the reinforcing alumina/silica fibers of the sort described above which are used to form a composite material with the matrix metal of the sort described above is within the above described preferred range of approximately between 2% and 10%, no particular influence on various other physical characteristics of the compound material such as thermal conductivity and coefficient of linear thermal expansion is exerted by the reinforcement by inorganic alumina/silica fibers, as compared to a material which is just composed of matrix metal with no reinforcing inorganic fibers. Accordingly, as will be seen later with relation to the following descriptions, this particular form of composite material using a matrix metal which is the above specified aluminum alloy and using reinforcing inorganic fibers which are the above specified alumina/silica fibers is particularly suitable for being used for forming the parts of an engine piston which are exposed to the most severe conditions during operation of an internal combustion engine.

EXPERIMENTS USING MAGNESIUM AS THE MATRIX METAL

A set of experiments similar to the above described experiments were carried out, using a composite material with matrix metal which is a magnesium alloy (JIS standard MC-8) and with reinforcing fibers which were alumina fibers, of approximately 95% by weight $Al_2O_3$ and 5% by weight $SiO_2$, and substantially the same results as above were obtained. Accordingly, as will be seen later with relation to the following descriptions, this particular form of composite material using a matrix metal which is the above specified magnesium alloy and using reinforcing inorganic fibers which are the above specified alumina fibers is also particularly suitable for being used for forming the parts of an engine piston which are exposed to the most severe conditions during operation of an internal combustion engine.

THE FIRST PISTON EMBODIMENT

Now, an engine piston which is a first preferred embodiment of the engine piston according to the present invention will be described, along with a method of making said engine piston, which is a first preferred embodiment of the method of making an engine piston according to the present invention. The engine piston is shown in axial cross section in FIG. 4, and an inorganic fiber reinforced part of said engine piston incorporating an upper ring groove and an upper land is shown in FIG. 5 in enlarged perspective view as cut by the axial section shown in FIG. 4. Further, FIG. 6 shows a stage in said method of making said engine piston, showing the piston preform and a mold therefor in axial cross section.

Figure 4:
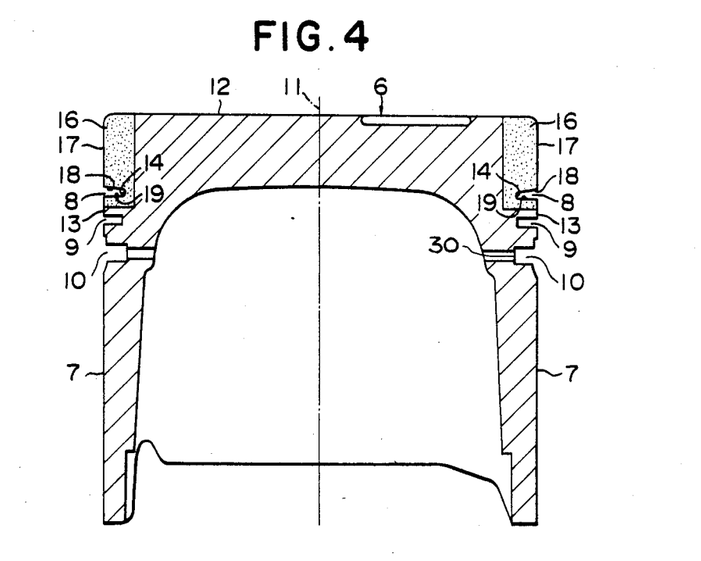
FIG. 4 is an axial cross section of an engine piston which has an inorganic fiber reinforced portion, and which is a first preferred embodiment of the engine piston according to the present invention.
Figure 5:
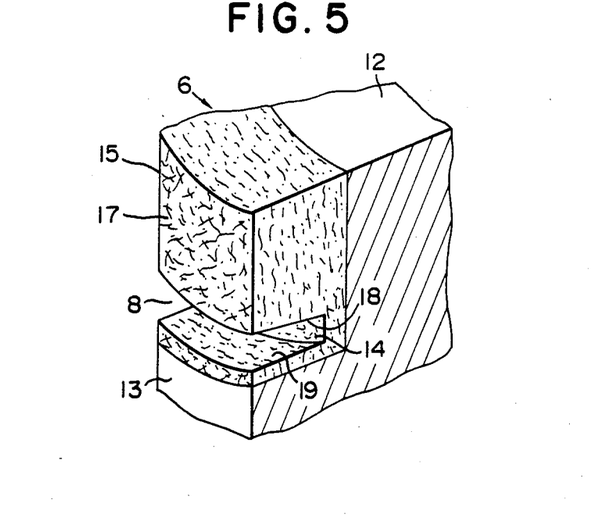
FIG. 5 is an enlarged perspective view showing said inorganic fiber reinforced part of said engine piston incorporating an upper ring groove and an upper land, as cut by the axial section shown in FIG. 4.
Figure 6:
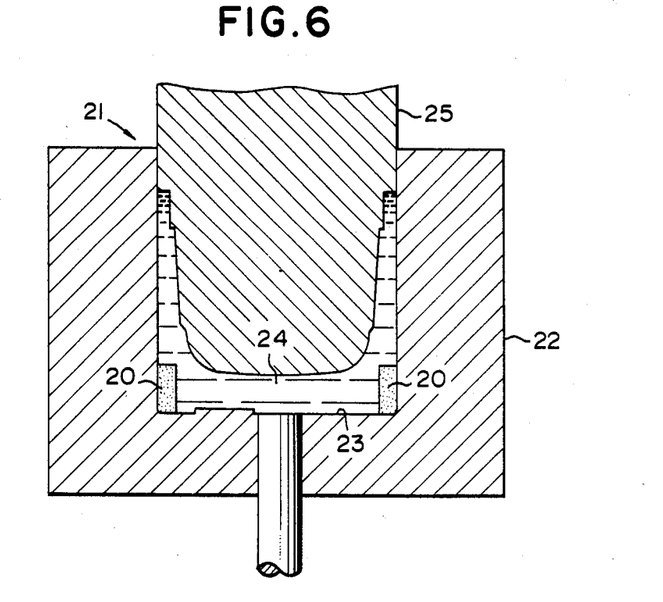
FIG. 6 is an illustration showing a stage in the manufacture of said engine piston which is the first preferred embodiment of the engine piston according to the present invention, said manufacture being the preferred embodiment of the method of piston manufacture according to the present invention.

Referring first to the finished piston as shown in FIGS. 4 and 5 and designated therein by the reference numeral 6, this piston is formed with a crown 12 and with a piston skirt 7 which has a cylindrical side wall surface. Around this cylindrical side wall surface there are formed three circumferential ring grooves, an upper ring groove, a middle ring groove, and a lower ring groove, which are designated by the reference numerals 8, 9, and 10 in that order from the piston crown towards the end of the piston remote therefrom, i.e. in that order from the top to the bottom of FIG. 4. The upper ring groove 8 is provided for the purpose of receiving an upper compression piston ring of a per se well known type which is not shown; the middle ring groove 9 is provided for the purpose of receiving a middle compression piston ring also of a per se well known type which is also not shown; and the lower ring groove 10 is provided for the purpose of receiving a lower oil scraper piston ring likewise of a per se well known type which is also not shown. The bottom of the lower ring groove 10 is communicated to the interior of the piston 6 through apertures 30; but this is not particularly relevant to the present invention. The upper annular side wall surface in the figures of the upper ring groove 8, i.e. the annular side wall surface thereof closest to the crown of the piston 6, is designated by the reference numeral 18; the lower annular side wall surface in the figures of the upper ring groove 8, i.e. the annular side wall surface thereof farthest from the crown of the piston 6, is designated by the reference numeral 19; and the annular bottom surface of the upper ring groove 8 is designated by the reference numeral 14. Between the upper ring groove 8 and the upper crown surface of the piston 6 there is defined an annular piston top land, denoted in the figures by the reference numeral 17. Further, between the upper ring groove 8 and the middle ring groove 9 there is defined an annular piston middle land, denoted in the figures by the reference numeral 13.

The main body of the piston 6 is constructed out of the abovementioned aluminum alloy (JIS standard AC8A), but a portion 16 is constructed out of a composite material which uses said aluminum alloy (JIS standard AC8A) as a matrix metal and which uses alumina/silica fibers (approximately 51% by weight $Al_2O_3$ and 49% by weight $SiO_2$) as reinforcing inorganic fibers. This portion 16 is configured as follows: it is circularly symmetrical forming an annulus around the top portion of the piston 6, and its cross section is approximately rectangular except for the upper ring groove 8. In other words: the composite reinforced portion 16 of the piston 6 is a cylindrical shell defined between an outer and an inner cylinder, the inner cylindrical surface of said composite reinforced portion 16 being of smaller radius than the radius of the annular bottom surface 14 of the upper ring groove 8, and the outer cylindrical surface of said composite reinforced portion 16 being of radius equal to the radius of the outer cylindrical surface of the piston 6 and defining the upper part of said outer cylindrical surface of the piston 6; said reinforced portion 16 extending, in the axial direction of the piston 6, from the upper crown surface thereof to an axial position along the axis 11 of said piston which is further removed from said upper crown surface than is the lower annular side wall surface 19 of said upper ring groove 8. Thus, said upper ring groove 8 is completely defined within said inorganic fiber reinforced portion 16 of the piston 6; i.e. the upper annular side wall surface 18 in the figures of the upper ring groove 8, the lower annular side wall surface 19 in the figures of the upper ring groove 8, and the annular bottom surface 14 of the upper ring groove 8, are all defined within said inorganic fiber reinforced portion 16 of the piston 6; and further the upper land surface 17 of the piston 6 is also defined within said inorganic fiber reinforced portion 16 of the piston 6. However, the middle land surface 13 of the piston 6 is only partly defined within said inorganic fiber reinforced portion 16 of the piston 6, having an annular boundary defined around approximately its axially middle portion, said boundary delimiting the portion 16 of the piston 6 which is reinforced with inorganic alumina/silica fibers from the remainder portion of said piston 6 which is not so reinforced.

It should be noted, because it is important to the functioning of the shown first embodiment of the piston according to the present invention, that these surfaces, i.e. the upper annular side wall surface 18 in the figures of the upper ring groove 8, the lower annular side wall surface 19 in the figures of the upper ring groove 8, the annular bottom surface 14 of the upper ring groove 8, and the upper land surface 17 of the piston 6, which are all defined within said inorganic fiber reinforced portion 16 of the piston 6, are in fact the surfaces of the piston 6 which suffer the most severe conditions during use of the piston 6; this is a fact well known per se in the piston art. Thus, because these surfaces are made of the above specified inorganic fiber reinforced composite material rather than of plain aluminum alloy, i.e. are reinforced, it is to be expected that the piston 6 will exhibit much improved durability with respect to frictional wear on these surfaces, and with respect to anti seizing characteristic, as evidenced by the results of the tests explained above.

METHOD OF MANUFACTURE OF THE FIRST PISTON EMBODIMENT

A particular example of the piston 6 described above, which is the first preferred embodiment of the piston according to the present invention, was made as follows, by practicing the preferred embodiment of the process of piston manufacture according to the present invention. In this connection, reference should be made to FIG. 6 of the appended drawings, which shows the process of manufacture of said exemplary piston 6.

A mass of inorganic fibers, designated by the reference numeral 20, was formed by vacuum forming as a hollow cylinder, of inner diameter 75 mm, of outer diameter 94 mm, and of height 20 mm, with a fiber density of 0.16 gm/cm$^3$. The fibers used were alumina/silica fibers, approximately 51% by weight $Al_2O_3$ and 49% by weight $SiO_2$, of which 95% had fiber diameters in the range of 1 to 20 microns, of which the average fiber diameter was 2.8 microns, and of which 93% of the fiber lengths were less than or equal to 20 microns. This fiber mass cylinder 20 was placed on the circular lower end surface 23 of a hollow cylindrical lower mold portion 22 of a casting mold 21, so as to fit around the bottom edge of said circular lower end surface 23, as seen in the figure. Next, a quantity 24 of molten aluminum alloy (JIS standard AC8A) was poured into said hollow cylindrical lower mold portion 22 of the casting mold 21, and a cylindrical upper mold portion 25 was fitted into said hollow cylindrical lower mold portion 22 and was pressed thereinto with a pressure of approximately 1000 atmospheres gauge, and this pressure was kept applied until the molten aluminum had completely solidified to form a piston preform, after a part of said molten aluminum had infiltrated under pressure into the fiber mass cylinder 20 and had intermingled intimately therewith. The shape of the cylindrical upper mold portion 25, as schematically shown in FIG. 6, was such as to impart a proper piston preform shape to the unified mass of solidified aluminum and reinforcing fiber material.

This piston preform (not particularly shown in the figures) was then subjected to heat processing of the sort commonly known as "T6" type, and then was further finished by machining such as grinding, to produce the finished piston 6 (which has an outer diameter of 90 mm) as shown in FIGS. 4 and 5. Thus, the part of the fiber mass cylinder 20 which remained after this machining, along with the aluminum alloy infiltrated thereinto, defined the inorganic fiber reinforced portion 16 of the piston 6, discussed earlier.

Figure 7:
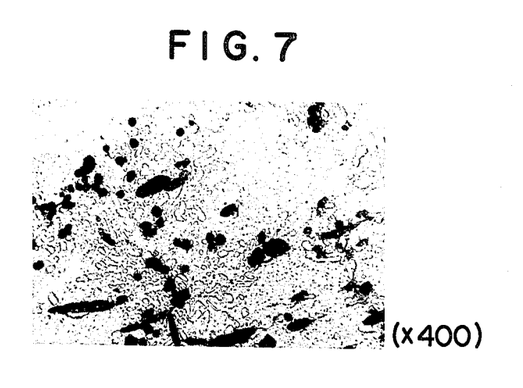
FIG. 7 is a photomicrograph, showing at a magnification of 400X the lower annular wall of the upper ring groove of the piston shown in FIGS. 4, 5, and 6, and showing that the reinforcing inorganic fibers in this part of the piston surface have a low surface parallel orientation ratio.
Figure 8:
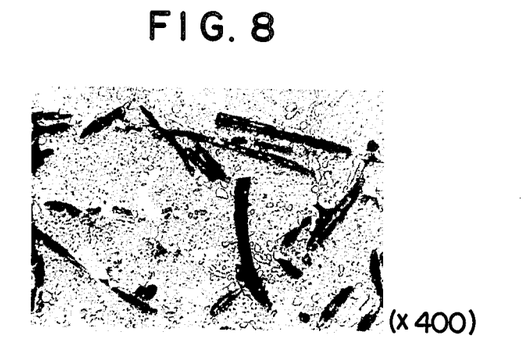
FIG. 8 is a photomicrograph, showing at a magnification of 400X the outer surface of the top land portion of the piston shown in FIGS. 4, 5, and 6, and showing that the reinforcing inorganic fibers in this part of the piston surface have a high surface parallel orientation ratio.

This inorganic fiber reinforced portion 16 in fact had an axial extent, along the axis of the piston 6, from the top of the piston 6 (i.e. from the crown of said piston 6) to a position on the side remote from said piston crown of the lower annular wall 19 of the upper ring groove 8 which was 2 mm away from said lower annular wall 19. Further, the radial extent of the inorganic fiber reinforced portion 16 was from the outer surface of the piston 6, i.e. from the outer surface of the first land portion 17 and/or the second land portion 13, radially inwards for a distance of 7 mm. Yet further, the average proportion by volume of inorganic fibers in this inorganic fiber reinforced portion 16 was 6.3%, and the surface parallel orientation ratios on the lower annular wall 19 of the upper ring groove 8, and on the outer surface of the top land portion 17, were respectively 14% and 73%. FIGS. 7 and 8 are two photomicrographs, respectively showing, at a magnification of 400×, said lower annular wall 19 of said upper ring groove 8, and said outer surface of said top land portion 17. The difference in the surface parallel orientation ratios of these two finished surfaces will be readily understood from these photomicrographs.

TESTING OF THE FIRST PISTON EMBODIMENT

The piston 6 whose manufacture has been described above was assembled into a four cylinder type four stroke cycle diesel engine, and its durability was tested. For comparison, a first comparison piston formed only of aluminum alloy (JIS standard AC8A), and a second comparison piston formed of aluminum alloy (JIS standard AC8A) with a cast in anti wear ring formed of Niresist cast iron, were also similarly tested. The tests were performed with the following parameters: the engine, which had a compression ratio of 21.5, a bore of 90 mm, a stroke of 86 mm, and a total displacement of 2200 cc, and which used diesel fuel, was run under full load at 4600 rpm for 500 hours; and then the engine was disassembled and the wear on the relevant parts thereof was measured. It will be appreciated that this test was quite a severe test, by current internal combustion engine standards.

The results of this testing process may be summarized as follows. The upper annular wall surface 18 and the lower annular wall surface 19 of the piston 6 according to the present invention were worn away to a maximum extent of 5 microns, which was substantially less than in the case of the first comparison piston formed only of aluminum alloy, and which was comparable to the wear in the case of the second comparison piston formed of aluminum alloy with a cast in anti wear ring formed of Niresist cast iron. Thus, from this point of view of wear resistance, the piston according to the first preferred embodiment of the present invention described above was at least as good as the second comparison piston formed of aluminum alloy with an anti wear ring of Niresist cast iron, and was definitely better than the first comparison piston formed of aluminum alloy only. Further, by examination of the top land portion 17 of the piston according to the present invention and of the top land portions of the first and second comparison pistons, it was found that, whereas both the first and second comparison pistons showed signs of seizing on their top land portions, no signs of seizing were found on the top land portion 17 of the piston 6 according to the first preferred embodiment of the present invention. Thus, from this point of view of seizing resistance, the piston according to the first preferred embodiment of the present invention described above was definitely better than the first comparison piston formed of aluminum alloy only, and was definitely better than the second comparison piston formed of aluminum alloy with an anti wear ring of Niresist cast iron.

Next, pistons were made by embedding CA thermocouples in the piston 6 according to the first preferred embodiment of the present invention, and in the second comparison piston formed of aluminum alloy with an anti wear ring of Niresist cast iron, described above, at depths of about 2 mm below the piston crowns thereof, in several places, and the pistons were operated in the internal combustion diesel engine again, being brought up to operating temperature. It was found from this experiment that the maximum temperature reached by any part of the piston 6 according to the first preferred embodiment of the present invention was about 50° C. less than the maximum temperature reached by any part of the second comparison piston formed of aluminum alloy with an anti wear ring of Niresist cast iron. Thus this confirmed that the piston according to the present invention had superior heat dissipation characteristics. It is considered that this is because the thermal conductivity of the inorganic fiber reinforced portion 16 of the piston according to the first preferred embodiment of the present invention was high, and thus the heat received by the piston crown thereof from the combustion gases was transmitted with high efficiency through said inorganic fiber reinforced portion 16 and through the upper piston ring (fitted in the upper ring groove 8 but not shown in the figures) to the engine cylinder. In order to confirm this, a test sample was cut from the fiber reinforced composite material portion of a piston preform of the piston according to the first preferred embodiment of the present invention described above, and its thermal conductivity was measured. The thermal conductivity obtained, of 0.23 cal/cm.sec.°C., was much greater than the thermal conductivity of Niresist cast iron, which is about 0.045 cal/cm.sec.°C.

THE SECOND PISTON EMBODIMENT

Figure 9:
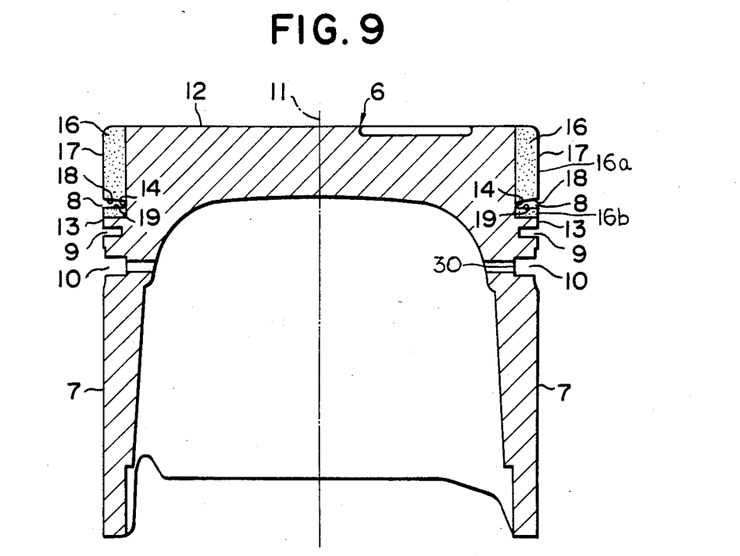
FIG. 9 is an axial cross section, similar to FIG. 4, showing another engine piston which has an inorganic fiber reinforced portion, and which is a second preferred embodiment of the engine piston according to the present invention.

In FIG. 9, there is shown a second preferred embodiment of the engine piston according to the present invention, in a fashion similar to FIG. 4. In FIG. 9, parts, grooves, elements, and gaps of the second preferred embodiment shown, which correspond to parts, grooves, elements, and gaps of the first preferred embodiment shown in FIG. 4, and which have the same functions, are designated by the same reference numerals and symbols as in that figure.

Referring to this piston shown in FIG. 9 and designated therein by the reference numeral 6, this piston is again formed with a crown 12 and with a piston skirt 7 which has a cylindrical side wall surface. Around this cylindrical side wall surface there are again formed three circumferential ring grooves, an upper ring groove, a middle ring groove, and a lower ring groove, which are designated by the reference numerals 8, 9, and 10 in that order from the piston crown towards the end of the piston remote therefrom, i.e. in that order from the top to the bottom of FIG. 9. The upper ring groove 8 is provided for the purpose of receiving an upper compression piston ring of a per se well known type which is not shown; the middle ring groove 9 is provided for the purpose of receiving a middle compression piston ring also of a per se well known type which is also not shown; and the lower ring groove 10 is provided for the purpose of receiving a lower oil scraper piston ring likewise of a per se well known type which is also not shown; all as before with respect to the first embodiment shown in FIG. 4 and in FIG. 5. The bottom of the lower ring groove 10 is communicated to the interior of the piston 6 through apertures 30; but this is not particularly relevant to the present invention. The upper annular side wall surface in the figure of the upper ring groove 8, i.e. the annular side wall surface thereof closest to the crown of the piston 6, is again designated by the reference numeral 18; the lower annular side wall surface in the figure of the upper ring groove 8, i.e. the annular side wall surface thereof farthest from the crown of the piston 6, is again designated by the reference numeral 19; and the annular bottom surface of the upper ring groove 8 is similarly again designated by the reference numeral 14. Between the upper ring groove 8 and the upper crown surface of the piston 6 there is defined an annular piston top land, again denoted in the figure by the reference numeral 17. Further, between the upper ring groove 8 and the middle ring groove 9 there is defined an annular piston middle land, again denoted in the figure by the reference numeral 13.

The main body of the piston 6 is again constructed out of the abovementioned aluminum alloy (JIS standard AC8A), but a portion 16 again is constructed out of a composite material which uses said aluminum alloy (JIS standard AC8A) as a matrix metal and which uses alumina/silica fibers (approximately 51% by weight $Al_2O_3$ and 49% by weight $SiO_2$) as reinforcing inorganic fibers. This portion 16 is, in this second preferred embodiment, configured as follows: it is circularly symmetrical, and is divided, forming two annuli 16a and 16b around the top portion of the piston 6; the cross section of the upper annulus portion 16a in the figure being approximately rectangular; and the cross section of the lower annulus portion 16b being substantially entirely rectangular. Thus, the cross section of the upper ring groove 8 divides said cross section of said upper annulus portion 16a of the composite reinforced portion 16 from said cross section of said lower annulus portion 16b of the composite reinforced portion 16. In other words: the composite reinforced portion 16 of the piston 6 is two axially opposed cylindrical shell portions 16a and 16b, each defined between an outer and an inner cylinder, the inner cylindrical surfaces of said composite reinforced portions 16a and 16b being of the same radius as one another and as the radius of the annular bottom surface 14 of the upper ring groove 8, and the outer cylindrical surfaces of said composite reinforced portion 16a and 16b being of radius equal to to one another and to the radius of the outer cylindrical surface of the piston 6 and defining the upper part of said outer cylindrical surface of the piston 6; said upper inorganic fiber reinforced annular portion 16a extending, in the axial direction of the piston 6, from the upper crown surface thereof to the upper annular side wall surface 18 of said upper ring groove 8; and said lower inorganic fiber reinforced annular portion 16b extending, in the axial direction of the piston 6, from the lower annular side wall surface 19 of said upper ring groove 8 to an axial position further removed from said piston crown than is said lower annular side wall surface 19 of said upper ring groove 8. Thus, said upper ring groove 8 is defined between said two inorganic fiber reinforced portions 16a and 16b of the piston 6; i.e. the upper annular side wall surface 18 in the figure of the upper ring groove 8 is defined within said upper inorganic fiber reinforced annular portion 16a of the piston 6, and the lower annular side wall surface 19 in the figure of the upper ring groove 8 is defined within said lower inorganic fiber reinforced portion 16b of the piston 6; and further the upper land surface 17 of the piston 6 is also defined within said upper inorganic fiber reinforced portion 16a of the piston 6. However, the middle land surface 13 of the piston 6 is only partly defined within said lower inorganic fiber reinforced portion 16b of the piston 6, having an annular boundary defined around approximately its axially middle portion, said boundary delimiting the lower annular portion 16b of the piston 6 which is reinforced with inorganic alumina/silica fibers from the remainder portion of said piston 6 which is not so reinforced. Further, in this second preferred embodiment, the annular bottom surface 14 of the upper ring groove 8 is not defined within either of said fiber reinforced portions 16a and 16b of the piston 6, but is defined within the remainder portion of said piston 6 which is not so reinforced.

It should be noted, because it is important to the functioning of the shown second embodiment of the piston according to the present invention, that these surfaces, i.e. the upper annular side wall surface 18 in the figure of the upper ring groove 8, the lower annular side wall surface 19 in the figure of the upper ring groove 8, and the upper land surface 17 of the piston 6, which are all defined within said upper and lower inorganic fiber reinforced portions 16a and 16b of the piston 6, are in fact the surfaces of the piston 6 which suffer the most severe conditions during use of the piston 6; this is a fact well known per se in the piston art. Thus, because these surfaces are made of the above specified inorganic fiber reinforced composite material rather than of plain aluminum alloy, i.e. are reinforced, it is again to be expected that the piston 6 will exhibit much improved durability with respect to frictional wear on these surfaces, and with respect to anti seizing characteristic. The fact that the annular bottom surface 14 of the upper ring groove 8 of the piston 6 is not defined within either of said fiber reinforced annular portions 16a and 16b may mean that this bottom surface is itself perhaps more prone to wear than is the bottom surface of the upper ring groove 8 in the first preferred embodiment of the piston according to the present invention shown in FIGS. 4 and 5, but in fact the annular bottom surface 14 of the ring groove 8 is not subjected to nearly so much wear as are the top and bottom side surfaces 18 and 19 of this ring groove 8, so that this may not be a very important disadvantage. Further, this constructional fact also makes for good heat conduction from the piston ring fitted in said upper ring groove 8 to the main body of the piston 6, which can be important for increasing durability of the piston 6; and, by reducing the amount of inorganic fiber required for construction of the piston, it also makes for cheapness of construction of the piston 6, as well as increased manufacturability thereof.

THE THIRD PISTON EMBODIMENT

Figure 10:
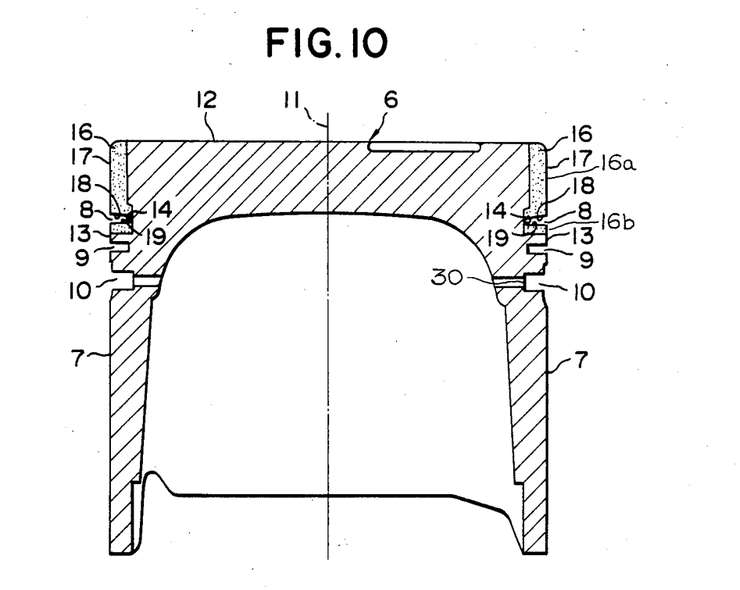
FIG. 10 is an axial cross section, similar to FIGS. 4 and 9, showing another engine piston which has an inorganic fiber reinforced portion, and which is a third preferred embodiment of the engine piston according to the present invention.

In FIG. 10, there is shown a third preferred embodiment of the engine piston according to the present invention, in a fashion similar to FIGS. 4 and 9. In FIG. 10, parts, grooves, elements, and gaps of the third preferred embodiment shown, which correspond to parts, grooves, elements, and gaps of the first and second preferred embodiments shown in FIGS. 4 and 9, and which have the same functions, are designated by the same reference numerals and symbols as in those figures.

Referring to this piston shown in FIG. 10 and designated therein by the reference numeral 6, this piston is again formed with a crown 12 and with a piston skirt 7 which has a cylindrical side wall surface. Around this cylindrical side wall surface there are again formed three circumferential ring grooves, an upper ring groove, a middle ring groove, and a lower ring groove, which are designated by the reference numerals 8, 9, and 10 in that order from the piston crown towards the end of the piston remote therefrom, i.e. in that order from the top to the bottom of FIG. 10. The upper ring groove 8 is provided for the purpose of receiving an upper compression piston ring of a per se well known type which is not shown; the middle ring groove 9 is provided for the purpose of receiving a middle compression piston ring also of a per se well known type which is also not shown; and the lower ring groove 10 is provided for the purpose of receiving a lower oil scraper piston ring likewise of a per se well known type which is also not shown; all as before with respect to the first embodiment shown in FIG. 4 and in FIG. 5, and with respect to the second embodiment shown in FIG. 9. The bottom of the lower ring groove 10 is communicated to the interior of the piston 6 through apertures 30; but this is not particularly relevant to the present invention. The upper annular side wall surface in the figure of the upper ring groove 8, i.e. the annular side wall surface thereof closest to the crown of the piston 6, is again designated by the reference numeral 18; the lower annular side wall surface in the figure of the upper ring groove 8, i.e. the annular side wall surface thereof farthest from the crown of the piston 6, is again designated by the reference numeral 19; and the annular bottom surface of the upper ring groove 8 is similarly again designated by the reference numeral 14. Between the upper ring groove 8 and the upper crown surface of the piston 6 there is defined an annular piston top land, again denoted in the figure by the reference numeral 17. Further, between the upper ring groove 8 and the middle ring groove 9 there is defined an annular piston middle land, again denoted in the figure by the reference numeral 13.

The main body of the piston 6 is again constructed out of the abovementioned aluminum alloy (JIS standard AC8A), but a portion 16 again is constructed out of a composite material which uses said aluminum alloy (JIS standard AC8A) as a matrix metal and which uses aluminum/silica fibers (approximately 51% by weight $Al_2O_3$ and 49% by weight $SiO_2$) as reinforcing inorganic fibers. This portion 16 is, in this third preferred embodiment, configured as follows: it is circularly symmetrical, and is divided, forming two annular portions 16a and 16b around the top portion of the piston 6; the cross section of the upper annulus portion 16a in the figure being formed as two abutted rectangles; and the cross section of the lower annulus portion 16b being substantially entirely rectangular. Thus, the cross section of the upper ring groove 8 divides said cross section of said upper annulus portion 16a of the composite reinforced portion 16 from said cross section of said lower annulus portion 16b of the composite reinforced portion 16. In other words: the composite reinforced portion 16 of the piston 6 is two axially opposed annular portions 16a and 16b, the lower annular portion 16b being defined between an outer and an inner cylinder, the inner cylindrical surface of said lower composite reinforced portion 16b being of the same radius as the radius of the annular bottom surface 14 of the upper ring groove 8, and the outer cylindrical surface of said composite reinforced portion 16b being of radius equal to the radius of the outer cylindrical surface of the piston 6 and defining part of the upper part of said outer cylindrical surface of the piston 6; and the upper annular portion 16a being defined between an outer cylinder and a stepped inner cylindrical surface, the smaller radius of said stepped inner cylindrical surface of said upper composite reinforced portion 16a being the same as the radius of the annular bottom surface 14 of the upper ring groove 8 and as the radius of the inner cylindrical surface of said lower composite reinforced portion 16b, and the larger radius of said stepped inner cylindrical surface of said upper composite reinforced portion 16a being of somewhat larger radius, so that the part above (in the figure) said stepped portion of said upper composite reinforced portion 16a is somewhat thinner than is its part below said stepped portion; the outer cylindrical surface of said upper composite reinforced portion 16a being of radius equal to the radius of the outer cylindrical surface of the piston 6 and defining part of the upper part of said outer cylindrical surface of the piston 6, i.e. said upper land portion 17 thereof; said upper inorganic fiber reinforced annular portion 16a extending, in the axial direction of the piston 6, from the upper crown surface thereof to the upper annular side wall surface 18 of said upper ring groove 8; and said lower inorganic fiber reinforced annular portion 16b extending, in the axial direction of the piston 6, from the lower annular side wall surface 19 of said upper ring groove 8 to an axial position further removed from said piston crown than is said lower annular side wall surface 19 of said upper ring groove 8. Thus, said upper ring groove 8 is again defined between said two inorganic fiber reinforced portions 16a and 16b of the piston 6; i.e. the upper annular side wall surface 18 in the figure of the upper ring groove 8 is defined within said upper inorganic fiber reinforced annular portion 16a of the piston 6, and the lower annular side wall surface 19 in the figure of the upper ring groove 8 is defined within said lower inorganic fiber reinforced portion 16b of the piston 6; and further the upper land surface 17 of the piston 6 is also defined within said upper inorganic fiber reinforced portion 16a of the piston 6. However, the middle land surface 13 of the piston 6 is only partly defined within said lower inorganic fiber reinforced portion 16b of the piston 6, having an annular boundary defined around approximately its axially middle portion, said boundary delimiting the lower annular portion 16b of the piston 6 which is reinforced with inorganic alumina/silica fibers from the remainder portion of said piston 6 which is not so reinforced. Further, in this third preferred embodiment, the annular bottom surface 14 of the upper ring groove 8 is again not defined within either of said fiber reinforced portions 16a and 16b of the piston 6, but is defined within the remainder portion of said piston 6 which is not so reinforced.

It should be noted, because it is important to the functioning of the shown third preferred embodiment of the piston according to the present invention, that these surfaces, i.e. the upper annular side wall surface 18 in the figure of the upper ring groove 8, the lower annular side wall surface 19 in the figure of the upper ring groove 8, and the upper land surface 17 of the piston 6, which are all defined within said upper and lower inorganic fiber reinforced portions 16a and 16b of the piston 6, are in fact the surfaces of the piston 6 which suffer the most severe conditions during use of the piston 6; this is a fact well known per se in the piston art. Thus, because these surfaces are made of the above specified inorganic fiber reinforced composite material rather than of plain aluminum alloy, i.e. are reinforced, it is to be expected that the piston 6 will exhibit much improved durability with respect to frictional wear on these surfaces, and with respect to anti seizing characteristics, as evidenced by the results of the tests explained above. The fact that the annular bottom surface 14 of the upper ring groove 8 of the piston 6 is not defined within either of said fiber reinforced annular portions 16a and 16b, although meaning that this lower surface is itself perhaps more prone to wear than is the lower surface of the upper ring groove 8 in the first preferred embodiment of the piston according to the present invention shown in FIGS. 4 and 5, but in fact the annular bottom surface 14 of the ring groove 8 is not subjected to nearly so much wear as are the top and bottom side surfaces 18 and 19 of this ring groove 8, so that this may not be a very important disadvantage. This fact is the same as in the case of the second preferred embodiment shown in FIG. 9. However, the difference in this third preferred embodiment, in that the upper annular composite reinforced portion 16a is stepped so that its upper portion in the figure is thinner than is its lower portion, is quite important, because this constructional fact makes for good heat conduction from the upper land portion 17 of the piston 6 to the main body of the piston 6, which can be important for increasing durability of the piston 6, even over the durability attained by making the annular bottom surface 14 of the upper ring groove 8 not be composed of composite fiber reinforced material (as in the second embodiment shown in FIG. 9); and also, by yet further reducing the amount of inorganic fiber required for construction of the piston by even more than the amount saved in the second embodiment shown in FIG. 9 over the first embodiment shown in FIGS. 4 and 5, it also makes for further increase in cheapness of construction of the piston 6, as well as further increased manufacturability thereof.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. An engine piston formed with a top crown surface, a top ring groove defined by an upper annular wall surface, a lower annular wall surface, and an annular bottom surface, and an upper annular land surface defined between said top ring groove and an annular edge of said top crown surface, said upper annular land surface and at least said upper and lower annular wall surfaces of said top ring groove being defined by a part of said piston formed of a matrix metal reinforced with inorganic fibers, the proportion of said inorganic fibers by volume in said fiber-reinforced part of said piston being substantially between two percent and ten percent, at least ninety percent of said inorganic fibers having fiber diameters between one micron and twenty microns, and at least ninety percent of said inorganic fibers having fiber lengths less than twenty millimeters, the surface parallel orientation ratio of said inorganic fibers making up at least said upper and lower annular wall surfaces of said top ring groove being fifty percent or less.

2. An engine piston according to claim 1, wherein said part of said piston formed of a matrix metal reinforced with inorganic fibers is circularly symmetrical and forms an annulus around the top portion of said piston, the cross-section of said annulus being substantially rectangular except for a portion occupied by said top ring groove.

3. An engine piston according to claim 2, wherein the depth in the radial direction of said piston of said substantially rectangular cross-section of said annulus is larger than the depth in the radial direction of said piston of said top ring groove.

4. An engine piston according to claim 2, wherein the depth in the radial direction of said piston of said substantially rectangular cross-section of said annulus is smaller than the depth in the radial direction of said piston of said top ring groove.

5. An engine piston according to claim 1, wherein said part of said piston formed of a matrix metal reinforced with inorganic fibers is circularly symmetrical and forms an annulus around the top portion of said piston.

6. An engine piston according to claim 5, wherein the depth in the radial direction of said piston of said substantially rectangular cross-section of said annulus is larger than the depth in the radial direction of said piston of said top ring groove.

7. An engine piston according to claim 5, wherein the depth in the radial direction of said piston of said substantially rectangular cross-section of said annulus is smaller than the depth in the radial direction of said piston of said top ring groove.

8. An engine piston according to claim 5, wherein the cross-section of the axial end of said annulus adjacent the top crown surface of said piston is narrower than the cross-section of the axial end of said annulus remote from the top crown surface of said piston.

9. An engine piston according to claim 8, wherein the radially inner surface of said annulus is stepped.

10. An engine piston according to claim 9, wherein the step in the radially inner surface of said annulus is between the top crown surface of said piston and said upper annular wall surface of said top ring groove.

11. An engine piston according to any one of claims 8, 9, or 10, wherein the depth in the radial direction of said piston of said substantially rectangular cross-section of said annulus is smaller than the depth in the radial direction of said piston of said top ring groove.

12. An engine piston according to claim 1, wherein said inorganic fibers are alumina-silica fibers having a composition of about 51% by weight $Al_2O_3$ and about 49% by weight $SiO_2$.

* * * * *